March 29, 1932. F. M. WIBERG 1,851,473
METHOD FOR REDUCING THE CARBONIC ACID IN CARBONIC
ACID CONTAINING GASES TO CARBON MONOXIDE
Filed Feb. 11, 1927
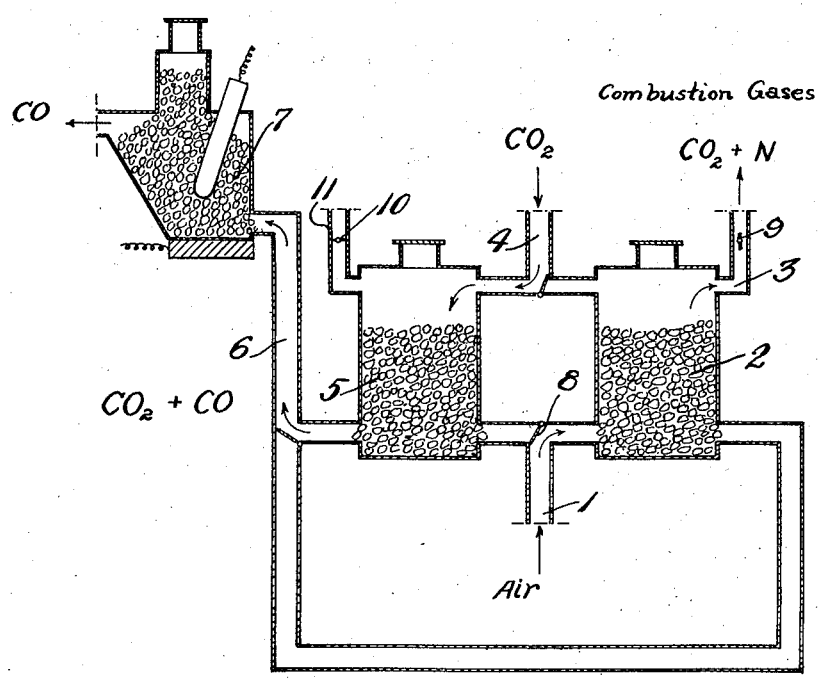
F. M. Wiberg
INVENTOR Patented Mar. 29, 1932

1,851,473

UNITED STATES PATENT OFFICE

FRANS MARTIN WIBERG, OF FALUN, SWEDEN

METHOD FOR REDUCING THE CARBONIC ACID IN CARBONIC ACID CONTAINING GASES TO CARBON MONOXIDE

Application filed February 11, 1927, Serial No. 167,593, and in Sweden February 27, 1926.

Applicant's previous U. S. A. Patent No. 1,401,222 describes a method for the reduction of ores by means of carbon monoxide gas, which can be produced by reducing the carbon dioxide in a carbon dioxide containing gas by means of carbon or carbonaceous material. For carrying out this reduction of the carbon dioxide heat must be supplied as the reaction is endothermic. In the said patent specification a practical form is described according to which this supply of heat is obtained by means of electrical energy.

The present invention has for its object a method of reducing the carbon dioxide contained in gases of the kind described, said method being principally adapted to be used in case of high prices of electrical energy for the purpose of reducing the costs for heating the carbonaceous material. The present method consists in this, that one part of the heat necessary for the reduction of the carbon dioxide to carbon monoxide is supplied in such a way, that air or oxygen is supplied, alternately with the carbon dioxide containing gas, for the combustion of one part of the carbon or the carbonaceous material. By means of the heat thus generated one part of the carbon dioxide, contained in the gas, is reduced to carbon monoxide, whereafter a further reduction of the carbon dioxide contained in the gas is effected by leading the gas into contact with carbonaceous material, heated by means of electrical energy. The last mentioned carbonaceous material can be contained in the same furnace, where a partial combustion is effected or in a separate furnace.

In practice the method can be executed in such a way, that the gas containing carbon dioxide is first caused to pass through an ordinary watergas producer, where the layer of coke is with certain intervals blown hot in the ordinary way by means of air, whereby the greatest part of the carbon dioxide is transformed into carbon monoxide, whereafter the amount of carbon dioxide can be further reduced at higher temperatures in an apparatus containing electrically heated coke, through which the gas is caused to pass after having passed through the water gas producers. In this case at least two watergas producers are required, which work alternately in such a way, that one is blown hot by means of air whilst the carbon dioxide containing gas is passed through the other one having previously been blown hot.

In the accompanying drawing is shown a diagrammatical view of a suitable apparatus for carrying out the present method.

Through tube 1 air is introduced into the producer 2, the valve 8 having then the position shown on the drawing. The gases formed during the hot blowing period are led off through tube 3, whose valve 9 is then open. Through tube 4 the gases used for the reduction of iron ore in the reducing furance (not shown) and containing large quantities of $CO_2$ are introduced into the producer 5 which has previously been hot blown. No air is thus mixed with said carbon dioxide containing gases when they are introduced in the hot blown producer. The valve 10 in the outlet tube 11 of said producer is then closed. The gases escaping from the producer 5 and still containing a certain percent of carbon dioxide are then introduced through tube 6 into the electrically heated carburettor 7 in which at higher temperatures than in the producers the rest of the carbon dioxide is reduced to carbon monoxide, so that a gas containing nearly only carbon monoxide is led off and supplied to the reduction furnace at the same time as its temperature is increased above 1000° C.

I claim:

The method of regenerating the carbon-monoxide in carbon-dioxide containing waste gases from the reduction of iron ore which gases are after the regeneration adapted to be used again for the reduction of iron ore, which method consists in hot-blowing a pair of cooperating gas producers by passing air therethrough thereby burning one part of the carbonaceous material, removing the combustion gases from the hot blown gas producer, introducing said carbon dioxide containing gases coming from the reduction furnace into the hot-blown gas producer, thereby reducing one part of the carbon dioxide to carbon monoxide, passing the gases coming from the said gas producer through electrically heated carbonaceous material for reducing the carbon dioxide still remaining therein to carbon monoxide, and introducing the gases thus treated into the reduction furnace.

In testimony whereof I have hereunto affixed my signature.

FRANS MARTIN WIBERG.